United States Patent [19]

Othmer

[11] 3,788,476

[45] Jan. 29, 1974

[54] SEWAGE TREATMENT SYSTEM

[76] Inventor: Donald F. Othmer, 333 Jay St., Brooklyn, N.Y. 11201

[22] Filed: Sept. 23, 1971

[21] Appl. No.: 182,967

[52] U.S. Cl.................. 210/194, 210/208, 210/241
[51] Int. Cl....................... B01d 21/06, B01d 21/24
[58] Field of Search... 210/207, 208, 101, 121, 241, 210/242, 249, 194

[56] References Cited
UNITED STATES PATENTS

| | | | |
|---|---|---|---|
| 3,182,801 | 5/1965 | Griffith | 210/207 |
| 3,481,868 | 12/1969 | Gilwood et al. | 210/208 X |
| R26,931 | 7/1970 | Valdespino | 210/207 X |
| 3,306,449 | 2/1967 | Minegishi | 210/207 X |
| 2,352,772 | 7/1944 | Darby | 210/208 |
| 1,573,085 | 2/1926 | Melani | 210/242 |
| 62,439 | 2/1867 | Perry | 210/249 X |
| 3,568,836 | 3/1971 | Ray | 210/242 X |

FOREIGN PATENTS OR APPLICATIONS

| | | | |
|---|---|---|---|
| 16,816 | 1/1913 | Great Britain | 210/101 |

*Primary Examiner*—John Adee

[57] ABSTRACT

A system is described for removing pollutants of waste waters, including domestic and other sewage, by simultaneous oxidation of organic wastes, both soluble and insoluble, and by sedimentation of insoluble particles causing turbidity. This is essentially a conventional solids-liquid contactor clarifier with some additions to provide means for: (a) addition of air or purer oxygen to sewage waters; (b) pressurizing the sewage water up to 10 atmospheres to increase solubility and concentration of oxygen-hence velocity of chemical and/or aerobic reaction; (c) withdrawing and depressurizing the sewage water to atmospheric pressure to allow most of dissolved gases to be released and to be discharged because of lower solubility for gases at atmospheric pressure; (d) recycling the sewage water for from 2 to 50 times through this pressurizing-depressurizing cycle; and, when used aboard ship, (e) means for installation in the ship's hold to minimize effects of the ship's movements on the sedimentation operation. It is particularly useful for smaller installations, for use on ships, and other places where waste from not more than several thousand people is to be handled. It also may be used as a sedimentation system alone wherein insoluble solids are settled out to give a clear effluent. The sludge solids produced in an earlier sedimentation, either with or without oxidation, may be oxidized and sedimented in a separate step in the equipment.

9 Claims, 6 Drawing Figures

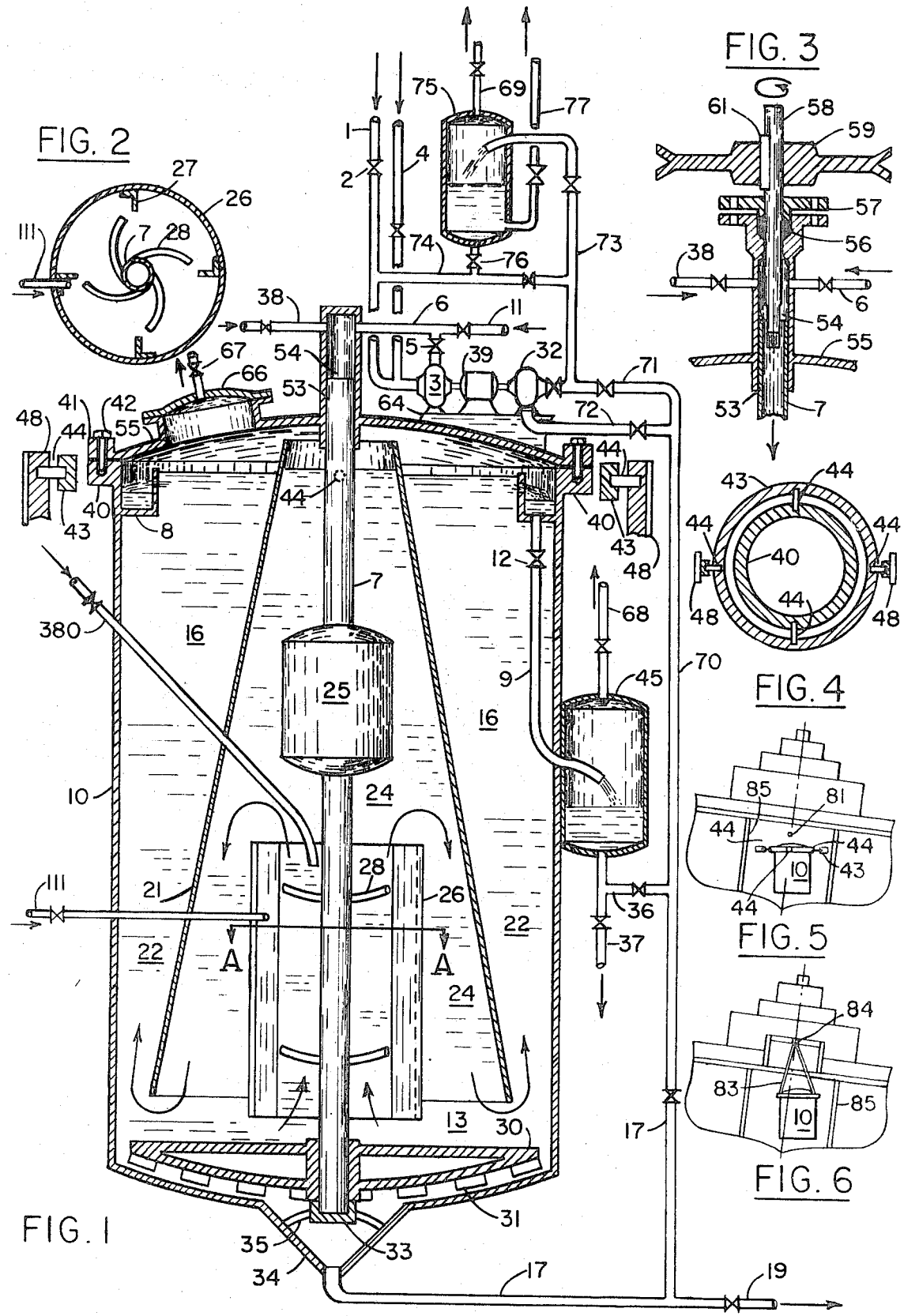

SEWAGE TREATMENT SYSTEM

This invention describes a system for treatment in a compact unit of domestic or other waste waters. It utilizes either sedimentation, oxidation, or both. Copending application Ser. No. 162,402 of July 14, 1971, describes a process of recycling through a high pressure oxidative reactor a sewage waste water by means of a pump with a suction of air or oxygen, to give an increased rate of oxidation of the organic impurities in the dissolved or suspended organic wastes due to the higher concentration of oxygen available in the liquid phase because oxygen has an increased solubility in water under pressure.

The oxidation may be total to give $CO_2$ finally, or it may be only partial to form insoluble solids which settle out from what previously has been solutions or suspensions of the colloidal and other large organic molecules and complexes.

This invention is of one form of equipment which may use some aspects of the invention of the copending application including the use of the sedimentation operation simultaneously with, or either before or after the oxidation operation. It may be used either at atmospheric pressure or at the pressure specified in the copending application up to ten or more atmospheres gauge.

Increasing pressure is being applied to the operators of passenger ships, including both fresh water and ocean going vessels to provide treating facilities for sewage which otherwise is simply pumped overboard. Especially, tourist ships pollute harbors of resort cities where they may lie-to or along-side piers for several days or more. Several such vessels, each with one to two thousand passengers may make less than pleasant the harbors of those places which their passengers have come to enjoy.

Little or no attempt has been made to process such wastes, which are simply discharged along side or at best stored in tanks below until the ship is again in the open sea, where the wastes are pumped to the sea. Increasing consciousness of the hazards and unpleasantness of pollution is adding pressure to the development and utilizing of equipment and process for its treatment aboard ship. The development of systems and methods for such treatment have been hindered by limitations of space, of weight and particularly of stability aboard ship—because of a ship's roll and pitch. These difficulties have now been overcome by the present invention of an even more simple, efficient, and economical system than those conventional on land with special advantages for use on shipboard.

The present equipment is entirely enclosed, thus cannot lose liquid by slopping over due to the ship's motion, nor unpleasant gases which may be vented outside the enclosed space. It also is so installed as to be almost free of motion due to the ship's roll and pitch, as is necessary for sedimentation to proceed properly.

The first and fundamental step in any sewage processing has been sedimentation which depends on a stability of the settling vessel. This is difficult to obtain aboard ship with the conventional ponderous unit requiring many hours of treating time by the methods used heretofore. Not only is its mass a hindrance to its use but the ship's motion has made ineffective its normal operation.

It has now been found that a system of sewage treatment depending on the novel method of sedimentation and oxidation of wastes described in the above mentioned copending application may be operated very satisfactorily when the axis of the process vessel is mounted on the vertical line between the center of buoyancy and the meta-center of the loaded ship. Preferably the center of gravity of the process vessel would be near the center of buoyancy of the ship. A minimum of motion of the ship to disturb the sedimentation is thus obtained in this position. Particularly is this true when the sedimentation tank is supported by gimbals to allow a pendulum like motion of the process vessel to compensate automatically for the motion due to the roll and pitch of the ship. The relatively low time required for the residence of the sewage liquid in the processing vessel by the efficient processes described allows the design of a very small unit relatively light weight-when filled, which becomes practical for mounting and servicing on a ship. Its axis is preferably on the line between the meta-center and the center of buoyancy of the ship, or if that is impractical, on the vertical plane drawn through the meta-center and the stern and prow of the vessel.

Among the objects of the invention thus are the perfection of:

a simple, compact apparatus which may be used on a small scale relative to conventional municipal sewage treating plants for the oxidative process of the copending application, and/or other sedimentation processes using various coagulating, flocculating, and sedimenting additives for assisting the clarification, a sewage treating unit wherein the sedimentation can be operated aboard a ship and be unaffected by the normal pitch or roll of the vessel due to the method of its support and its location in the ship, a simple system for sewage treatment aboard ship which will occupy a minimum of space, may be used to give a very good effluent when the ship is in port, and may be used somewhat differently when on the high seas to treat the sludge accumulated in the operation while in port.

Other objects will be more evident from the following description of the equipment which successfully attains these and other objects.

FIGURES

In the accompanying FIG. 1 is an elevation view, partly in cross-section of one form of the mechanical system of the invention which may be utilized to treat sewage aboard ship, or when simplified somewhat in shore installations.

FIG. 2 is a horizontal cross-section of the inner well, shaft, baffles, and jet impellors taken at A—A looking downwardly to show the arrangement of the rotating jet influent nozzles in the central well with jet streams impinging on baffles.

FIG. 3 is an elevation, partly in cross-section, of an alternative design of the top bearing of the hollow shaft-influent line, with inlets for influent and for additives, when an external motor drive is desired.

FIG. 4 is a diagram, not to scale, of a cross-section taken at the line of the gimbal bearings or pins to show the general arrangement and operation of the gimbals system.

FIG. 5 is a diagram of a lateral cross section of a ship at the extremity of its roll showing a preferred position of the sewage treating tank when supported by a gimbals.

FIG. 6 is a diagram of a lateral cross section of a ship at the end of its roll showing a preferred position of the sewage treating tank when supported by cables as a pendulum.

DESCRIPTION OF THE EQUIPMENT

Referring more particularly to the figures, the novel system is seen to be built around a tank, 10, in which there is a central well, 26, a surrounding cone, 21, and an upper internal overflow peripheral trough, 8, for clear effluent. A hollow shaft, 7, for supply of influent, supports a series of rakes, 31, carried by rake frames, 30, which, as in the prior art, may be hinged at the center to be lifted by obstructions.

Raw sewage, priorly screened for particles larger than about 1½ inches, is then comminuted to reduce particles to a size less than about one-fourth inch. Influent enters pipe, 1, with throttling valve, 2, at the suction of pump, 3, with motor, 39, to give a negative suction head at its inlet. The cavitation draws in air through valved line, 4, to be intimately mixed in 3. Air is mentioned herein; but commercial oxygen, 90+ percent, or even 99+ percent, may be used, or air enriched with oxygen, to give the advantages of the process of copending application Ser. No. 162,402. A substantial amount of liquid from previous treatment may be recycled by mixing with the influent and entraining more air as it again passes through pump, 3. Alternatively, if only sedimentation is desired without ingestion of air, the pump, 3, may be unnecessary and is shut off from the system by valve, 5; and the valved feed line, 11, is used.

Either with or without pump, 3, aids for improving the coagulation, flocculation, and sedimentation process may be added through lines 38 or 380. Conventional aids, ferric chloride or alum, may be used, or special materials to give a high performance of the clarifying system as described in U.S. Pat. Nos. 3,338,828 and 3,388,060, i.e., polyelectrolytes and acid-treated fly ash, with sufficient lime to give a pH of 10.5 or 11.

The aerated influent together with any additives pass down the center of the shaft, 7, (shown in elevation) and out through a number of nozzles, 28, so formed as to give the hydraulic reaction effect of the jet discharge. This is better shown in FIG. 2, with the jet action of the influent liquid impinging on the angle-iron baffles, 27, fastened to the central well, 26, and turning the shaft in the reverse direction to that of the jet motion.

In addition to this hydraulic energy supply, there is an excellent mixing of the components of the influent and some part of the sludge material, 13, present in the lower part of 10.

Furthermore a slight upward curvature of the nozzles, 28, as shown in FIG. 1 promotes an upward motion of the liquid in the well to lift some part of the sludge solids which have been sedimented out. These particles act as nuclei for flocs to form in the clarification process. In those cases where the best operation of the process requires one or more of the additives to be introduced after the others, these may be introduced through valved line 380 at a point within the agitation zone of the upper part of the space enclosed by the central well, 26.

Thus there is a rising stream of liquid inside the central well, an overflow at its top, as the mixing continues; the mixed liquid passing downwardly inside the cone 21, under its skirt with flocs forming as larger and larger assemblages of smaller particles. This tendency for small particles to accumulate on other solids of the sludge continues in the liquid passing under the bottom of 21 and rising between 21 and 10. The tendency increases for the larger particles to settle entirely in space, 16.

Most of air added is dissolved under high pressure in 10 to supply oxygen demand; and undissolved air rises inside 26 and 21 to cause mixing without interference with clarification, and it may be vented from 67 or discharged with effluent through 9. If no air is added, clarification without oxidation proceeds.

As the upward velocity of the liquid is reduced due to the greater cross-section of the space between the walls of the cone, 21, and the cylinder, 10, the solids settle slowly, with their large, soft flocs entraining all other suspended solids, even the smallest, to allow a completely clarified liquid to pass through orifices in the peripheral vertical wall of the trough, 8, and to exit through pipe, 9.

The shaft-influent line, 7, has an upper machined bearing, 53, also a lower or foot bearing, 33, which is supported by a spider, 35, with large openings to allow free passage of the solids, but firmly attached to a conical sludge-collection bottom, 34. There may be a slight leakage at the bearings because of the hydraulic pressure in 7 representing the low pressure drop across the nozzles. This leakage is internal, and of no moment in either case.

The weight of the shaft and rake assembly add to the friction on the foot bearing, 33, but this weight is counterbalanced by the buoyancy of the hollow float chamber, 25, attached to, and rotating with the shaft, 7, thus reducing the friction. This buoyancy is further adjusted so that it compensates also for the upward component given by the jets, transferred to the fluid rising in the central well and reacting as a slight downward thrust.

The rake support, 30, is fastened to the shaft, 7, and holds the rakes, 31, so that they slowly rotate to beat the water out of the sludge and, because of their being set at an angle to the radii, force the solids toward the center conical section, 34, and discharge line, 17. As in a conventional system of this type, provision is made to use fresh water for flushing back or backwashing of the sludge line, 17, and its connection to the system in order to prevent stoppage, but since this connection is standard practice, it is not shown here.

The relatively high through-put of sewage possible using this system requires a capacity of only about one-fourth to one-half cubic foot of volumetric capacity in tank, 10 per person. Thus the unit when mounted on a ship is relatively small and lightweight as compared to the equipment required for sewage treatment systems conventionally used. Indeed, the mass and size of conventional clarification systems have entirely prevented their use aboard ship.

Hence, it is possible to support the system of the present invention in gimbals, located as high on the tank 10 as possible. One suitable system is shown in FIG. 1 where a heavy ring, 40, welded to the top rim of 10 mates, having a gasket between, with another heavy rim, 41, welded to the cover, 55. Bolts or studs, 42, make a joint with the gasket which is tight against any desired operating pressure. Ring 40 is the inner gimbals ring with two bearings, 44, one immediately in the front of 10 as shown in FIG. 4, not in 1, and the other in the far rear, as shown by the very small dotted circle in FIG. 1. The outer gimbals ring, 43, also has two bearing pins, 44, one for the left and one for the right. These last gimbals pins carry the weight to some sturdy steel posts, 48, of the ship's framing.

This is illustrated in the diagram of FIG. 4 wherein the inner gimbals ring—actually the flange, 40, welded to the top of 10—is shown in cross-section, suspended from the outer gimbals ring by the upper and lower (front and back) pins, 44. Ring 43 in turn is supported from the heavy steel of the ship's frame by two outer pins, 44.

While the gimbals are shown using as one ring the top flange of the tank, 10, and this is a desirable construction, they may be either above or below this level to suspend the tank, the accessories and piping attached thereto, and the contents thereof, from above the center of gravity of the total mass. Instead of the gimbals, several cables of equal length may be connected to 40 and to a single strong point of suport above on the axis of 10. This gives a simple pendulum to dampen the ship's motions, with soemwhat more lateral movement of the unit.

In the diagram of FIG. 4 it may be assumed that the horizontal centerline is that of the ship, thus the two outer pins will allow the processing tank 10 to swing laterally with the roll of the ship and the two inner pins will allow the flange ring, 40 and 10 which it supports to swing with the pitch of the ship. The combination operates to correct for substantially any combination of motions of the ship, and even if these motions are relatively violent, the sedimentation can proceed without impairment of its efficiency.

FIG. 5 diagrams a desired location of the system, represented by the tank 10, in the hold of a ship 80 which is here indicated in the position of the maximum displacement due to a roll, the angle of which is indicated by the angle formed between the walls of the tank 10 and the vertical centerline of the ship through its meta-center 81. The fore and aft gimbals pins 44 are on the longitudinal center plane of the ship. They allow lateral angular displacement of the tank 10 and accessories due to roll, and carry the load, transferred through the gimbals ring 43, to posts or other parts of the ship's framing structure 85. The gimbals pins 44 on the lateral positions allow a longitudinal angular displacement of the tank 10 and accessories due to the pitch, and carry the load from the flange ring 40 to the gimbals ring 43.

FIG. 6 similarly diagrams a pendulum suspension of the tank 10 and accessories. Here 3 or more cables of equal length are attached to the top flange ring 40 and the cover flange ring 41 and are connected to an upper point of suspension from a suitably located point 84 in the ship's framing structure. This pendulum suspension compensates for any combination of pitch and roll of the ship; and the normal swing of the pendulum may be dampened by any desired combination of springs or in other conventional ways.

It is been found that the sedimentation operation is least affected by the motion of the ship when the axis of the sedimentation tank is on the vertical line between the meta-center and the center of buoyancy, and is best when the center of buoyancy of the ship is also the center of gravity of the sedimentation tank and its contents.

The center of buoyancy of the ship may be at an unsuitable position for this equipment for other considerations; and it may be necessary to lower 10 to a lower position in the hold. This may be done, although there is then some slight additional motion of 10; but if at all possible the tank, 10, should have its axis on the line between the center of gravity and the meta-center. If even this is impossible, this axis of 10 should be in the center vertical plane of the ship from stem to stern.

A manway, 66, and a suitable cover made tight against the operating pressure allows access to the interior of 10. Necessary gasket and bolts are not shown as being conventional. The feed and recycle pump, 3, and its motor, 39, are mounted as a unit on a platform, 64, built up on the cover, 55. Feed connections have least motion when mounted on the top, near the plane of the bearings of the gimbals.

A vent line, 67, with valve, allows discharge of gas and is located on the manway cover, 66, or other position on the top, 55. Like other vents, it would be connected to a pipe extending beyond the confines of the ship.

In FIG. 3 is shown an alternative top connection for the drive shaft, 7, and the influent pipe, 6, and additive inlet, 38, wherein a positive motor-drive is used to drive the shaft, 7, rather than using a reaction turbine effect of the jets, 28. Here the top inlet chamber, 54, is reduced to a size suitable for a smaller solid shaft, 58, made tight against leakage by a packing gland, 56, with follower 57. A pulley, 59, indicates a drive by a motor, not shown, at a suitable slow speed for the shaft, 7. Torque is transmitted through a key, 61, fitted on an elongation of the shaft, 58. The lower end of 58 is flattened to engage in a slot cut to fit in the top of hollow shaft, 7. In the use of an external source of power for driving the shaft, 7, additional conventional mechanical agitators, not shown, may be mounted thereon if desired. Thus the jet action of 28 may be dispensed with and the feed may be introduced by another line, 111, through walls 10, 21, 26, as alternative.

Still another alternative system, not shown in the drawing would allow a gear arrangement, preferably just above the rake support, 30, which would allow a pinion gear attached on 7 to drive an intermediate gear with fixed bearing which in turn would drive a large gear on the rake mechanism at a very much slower speed (as the minute hand and the hour hand on a clock are both concentric and operate at different speeds). This allows the much greater speed of rotation of the nozzles, 28, to secure greater agitation in 24 than the slow speed of the rakes. Such a gear arrangement might use power either from a driver pulley, 59, or from the jet action—the higher speed, lower torque—of the nozzles, 28, to be converted to a lower speed, higher torque required for the rakes.

The design of the tank, 10, and its accessories is preferably such as to allow a pressure oxidation under from one-half to 5 atmospheres gauge pressure, or possibly as high as 10 atmospheres gauge pressure to allow the pressure oxidation specified in copending application Ser. No. 162,402 with air or oxygen drawn in at 4 by the suction of the pump, by connection to 11 if air or oxygen is under appropriate pressure.

In this relatively small system, the power requirements of the motor, 39, are usually not sufficient to warrant recovery of energy given up in expansion of the liquid and gas from the high pressure which may be maintained in 10 down to the lower atmospheric pressure. However, an expander water turbine, 32, may be installed between the line, 9, discharging the pressure liquid and the gas disengaging chamber to recover such power if desired and minimize that required. Other energy recovery device may be used instead.

By support of the tank 10, by the gimbals near its top, the minimum of motion in relation to the ship is also at the top; and these piping connections will have a minimum of relative motion and corresponding extension and contraction. Influent line, 1, will have a hose or other flexible connection to its source of waste water. The feed of chemical additives at 38 also may be by a flexible hose connection, although in many cases these additives may be separately added to the influent at 1. If air is simply sucked in at 4 by the cavitation of the pump, 3, no connection is provided, as would be the case if oxygen under pressure is to be used, by connection to 11.

Both lines for venting and sludge handling, which are part of the system, may also be connected by flexible hose to discharge lines rigidly attached to the ship.

By mounting the necessary accessories on the side or top of the basic unit tank, 10, and supported thereby so as to be kept vertical and independent of the movement of the ship, a minimum of flexible pipe connections are required to make the connections to the piping attached rigidly to the ship's frame. The sludge discharge at 19 will also have a hose connection to its point of disposal also, as usual, to a pressure water connection for backwash. The alternative feed pipe, 111, would have a hose connection to the supply pipe of the waste water.

Overflow of more or less purified liquid passes through orifices or over the top of the peripheral weir, 8, to run through valve, 12, and down through pipe, 9. Liquid must flow out line 9 as fast as it enters the system of the tank, 10. The valve, 12, on line 9, may control this automatically if it is operated by a float (not shown as being a standard method of level control) or otherwise controlled by the level of the liquid in 10. Alternatively, external mounting of the valve, 12, and controls, may also be arranged, or the valve, 12, may have a stem through the wall of 10 using a stuffing box.

If the operation is conducted under pressure with air for oxidizing impurities in the waste waters, any oxygen, nitrogen, carbon dioxide or other gas dissolved in the more or less purified water leaving at 9 will be much less soluble in this water at atmospheric pressure. If the gases dissolved at the higher pressure are above the solubility limits at atmospheric pressure, these gases will desorb in the depressurizing tank, 45, which, for convenience, may be attached to the wall of 10.

Pipe, 9, discharges into 45, pointing downwardly near to and at a small angle with the inner wall, so as to separate liquid at the bottom and the desorbed gas through a valved vent line, 68. The velocity and intertia of the liquid will cause it to flow to the side wall, break any bubbles of gas and foam to allow gas to separate at the center and go off 68 at the top. Effluent may be passed through pipe, 37, sufficiently purified for discharge into clean waters.

Alternatively, by closing the valves on pipes 68 and 37 and opening valve, 36, effluent from 10 may be recycled for further treatment in 10 as described in copending application Ser. No. 162,402, through pipe lines, 70 and 72, the water-turbine, 32, or other equivalent energy recovering system, and pipeline, 73, to an alternate gas desorbing chamber, 75, with valved vent line, 69. If complete recycle of liquid is desired in a periodic or batch operation, all liquid passes from 75 through control valve, 76, line, 74, and back to influent, line 1. If some or all liquid from 75 is to be discharged from the system, it is discharged through valved line, 77. Particularly if sludge is to be oxidized in a periodic operation, it may be recycled from 17 through line, 70, to join liquid from 45, now operated merely as a conduit since valved lines, 68 and 37, are closed. All of the mixture passes through 70, 32, 73, 75, 76, and 74, back to influent, line 1, which then would not be carrying any influent; and inlet valve, 2, is closed during such a batch operation.

The location of the desorbing tank, 75, is shown diagramatically in FIG. 1. It may be installed at any convenient place. One such place is on the cover, 55, of 10; and it may be operated also during the usual continuous operation (without recycle of sludge through 17). Then the valve in line, 72, would be closed, as would the one on the discharge of 32; and lines, 71 and 73, would be used to discharge to 75; thence the liquid would leave the system through valve, 76, and line, 74.

The desorption tank, 75, must be used when energy is recovered by 32; at other times, 45 may be more convenient to use, and if energy is not to be recovered but liquid is to be recycled, the liquid sequence may be through 45 (vented at 68 and with some withdrawal at 37), then through 36, 70, 71, 74, and 1, back to 10. Alternatively, liquid would pass through 45 (not vented at 68), 36, 70, 71, 73, 75 (vented at 69), with some withdrawal at 77, then through 76, 74 and 1, to return to 10, with intake of additional air through 4.

USES OF THE SYSTEM

For Sedimentation Under Atmospheric Pressure Aboard Ship

Prescreened and cominuted sewage is fed through influent, line 11, inlet chamber, 54, pipe shaft, 7, and jet arms, 28, to the space inside the central well, 26, where the rising of the liquid caused by the upward discharge from jets, 28, causes an uplift of some sludge particles already settled in space, 13, and causes flocculation to proceed thereon. This may be aided by chemical materials added at 38 or 380, such as those indicated in U.S. Pat. Nos. 3,338,828 and 3,388,060; including activated fly ash, ferric chloride, a polyelectrolyte, and lime sufficient to give a pH of 10.5 to 11.0.

The mixture passes downwardly under the skirt of 21 and into the space, 22, where a mass of flocculated solids settles; and the liquid rises as it increases in clarity. The cross-section of this space, 16, between the conical wall, 21, and the cylindrical wall, 10, increases upwardly, thus the upward linear velocity of the rising liquid decreases, and settling is aided. The total time of the liquid in 10 is from 15 minutes to 3 hours; and the usual time is from 20 minutes to 45 minutes. By the use of the additives of the previous art, a clarified liquid, substantially free of solid particles, bacteria, phosphates, and odor, and with from 60 to 90 percent of its BOD removed, discharges through the orifices or overflows into the trough, 8, then by way of pipe, 9, and wide open valve, 12, through 45 and 37, to be discharged to clean waters, e.g., the sea, if aboard an ocean-going ship, or a river if a land-based installation.

The motions of the ship are almost entirely dampened by the suspension of the system in and by the gimbals; and the sedimentation proceeds without being affected by motions caused by the sea, particularly if the axis of 10 is on the vertical plane through stem and stern of the ship, and even better if the axis of 10 is on the vertical line between the meta-center and center of buoyancy of the ship.

The settled sludge in the space, 13, is collected by the rakes into the conical sludge pit, 34, and it may be compacted further there by sludge thickeners (not shown, since they are conventional in use.) Sludge is withdrawn through 17 and valved line, 19, in a substantially sterile, odorless form, and usually containing about 10 percent or even more solids, rather high because of the additives used and the excellent clarifying ability of the system. Sludge may be discharged periodically through 19 and received in a sheet plastic bag supported in a suitable drum. In coal or oil-burning steamships, it is often possible to charge the filled plastic bag into the furnace under the boilers for complete incineration of the sludge. Sufficient weight may be added in the bag, since the density of the sludge is only slightly greater than that of the water used, the bag is closed and slipped out of the drum into the sea, in which it sinks because of the added weight.

Incineration of raw sewage had been practiced in some ships; but the heat load to evaporate the water is considerable. By this invention, after this system has removed over 99 percent of the water, only a reasonable amount remains in the sludge to be evaporated during the incineration.

In the operation of the unit, when the ship is in a port, it may not be possible to dispose of this sludge formed by sedimentation, although the liquid effluent may be unobjectionable in its highly clarified form, with a residual of only 10 percent of the original BOD. Sludge may then be accumulated in plastic bags or other containers until a convenient time later. Then, when the ship is on the high seas, the sludge may be treated in the same unit, or the sludge may be weighted and dumped overboard.

The course of liquid flow in this use of the system merely for sedimentation under atmospheric pressure, is as follows:

Sewage enters at 11 or 111 with additives in at 38 or 380; mixing is accomplished in well, 26, and space, 24, with some previously sedimented sludge from 13. Sludge discharges through 17 and 19; the liquid rises through 16; and clarified effluent discharges by way of 8, 12, 9, 45, and 37.

Sedimentation and Oxidation Under Pressure Without Recycle

The operation may be substantially that as indicated in copending application Ser. No. 162,402. Screened and comminuted feed is introduced at 1 through valve 2, which is throttled to maintain a cavitation on the suction of pump, 3, which draws air from 4 along with the influent into pump, 3. The air is violently mixed with influent in the pump to be dissolved therein under the increasing pressure.

The pressurized mixture passes through 54, where coagulating aids may be added through valved line, 38, and the mixture passes through 7 and jets, 28. Any undissolved gas as bubbles rises to the top and out the cone, 24, while giving agitation to the liquid therein. This gas may be vented through 67 without interfering with the flocculation and sedimentation in lower space, 24, or space, 16.

The greatly increased amount of oxygen, which is dissolved in the waste water due to the pressure, supplies much of the BOD as it oxidizes organic impurities, particularly those dissolved in the liquid. The coagulation, flocculation, and clarification proceeds as before to remove particulate matter. Liquid passing through 8, purified to a major extent, is controlled by valve, 12, for discharge into the depressurizing tank, 45, which is vented to the atmosphere by 68. Effluent discharges through valved line, 37, to the receiving waters. Sludge at 13 is partly lifted in the well, 26, somewhat "activated" by the detention time there, to be mixed with influent in space, 24; and, finally, sludge passes through 33 and 17 to valved line, 19, and again is discharged as above.

In this operation, somewhat more of the BOD may be eliminated and the effluent liquid will be clarified very much as when sedimentation alone is accomplished, as in the previous example. Also, the treatment of liquid with air ingested into the pressurizing pump, with the subsequent oxidation of some of the pollutants and the settling of others as a sludge, requires a somewhat longer detention time, i.e., from 1 to 3 hours, as compared with simple clarification.

The course of flow in this sedimentation and oxidation under pressure without recycle is as follows: Sewage influent is in at 1 through valve, 2. It ingests air from 4 and passes through pump, 3, then through 6 at the elevated pressure with additions of chemicals, in at 38 or 380. Liquid passes then through 54, 7, 28, 24, 22, 16, 8, 12, and 9; then its pressure is reduced in 45 which is at atmospheric pressure; and it discharges at 37 to the receiving waters, while gases are vented at 68 and sludge discharges at 19.

Sedimentation and Oxidation Under Pressure with Recycle

To take advantage of the process of copending application Ser. No. 162,402, liquid after sedimentation may be recycled with added air each time, to reduce further its BOD. The system is operated as in the last example; however, valve 12 is open, and valved lines 37 and 68 are closed; so that 45 operates at substantially the same pressure as in 10. Partially purified liquid passes through valve, 36, line 70, 71, and line 73 with its valve suitably throttled, then through depressurizing chamber, 75, which is vented to atmospheric pressure at 69. Part of the liquid passes through line 74 back to influent line 1, and part is discharged from the system through line 77. The ratio of recycle to withdrawn liquid may be about a low of one-tenth or one-half to the complete or 100 percent recycle of a batch operation until the desired amount of oxygen is accomplished in supplying the BOD. When completely recycled, this may be for from 5 to 25 times, or even as many as 50 times, depending on the amount of oxidation to be accomplished.

Organic impurities are oxidized by the air ingested in each cycle. Particularly is this true for those dissolved in the liquid, since the sludge has settled at 13 and is removed, receiving little additional contact with oxygen in the subsequent recycles. Besides carbon dioxide formed by the oxidation of the heavy molecules, usually some insoluble solid products are also formed in a partial oxidation or decomposition. These precipitate and are removed with the other sludge solids before they are completely oxidized. Thus, a much larger removal of impurities, as measured by the BOD or COD, is accomplished than would be expected merely from the amount of oxygen supplied in air or as more or less pure oxygen.

Sedimentation and Oxidation under Pressure with Recovery of Mechanical Energy

Either of the last two methods of operation of the system may be modified to recover a part of the potential mechanical energy of the liquid gas mixture in 10 at its super-atmospheric pressure.

Desorbing tank, 45, is operated at the pressure in 10, clarified liquid passes through 36, 70, 72, then through liquid-turbine, 32, which converts expansion energy to supply, in part, that used by pump, 3. The pressure of the liquid and desorbed gas are reduced to that of the atmosphere, as maintained in 75, by venting at 69. Effluent leaves at 77 and any recycle goes through 74 to influent line, 1.

Oxidation of Sludge

Sludge may be accumulated and stored during operation of the unit merely for sedimentation and clarification of a liquid effluent while a ship is in port. Later this sludge may be oxidized by feeding at 1 through 2, and the pump, 3, with air ingested through 4. The unit is then operated largely as an oxidizing unit, as described in copending application Ser. No. 162,402. Recycle of the sludge through 17, 70, 71, 73; or via 72, water-turbine, 32, then 73, thence through degassing chamber, 75, back into 1 and pump, 3, with ingestion of more air through 4. Recycle as many as 5 to 50 times may be required to reduce the BOD sufficiently during a time as much as 5 hours. Meanwhile, a relatively small amount of clarified liquid may be removed from 37; and this amount would be balanced by the addition of more sludge as influent at 1.

Similarly the unit of this invention may be used to dispose of sludge from a primary or a secondary conventional treatment plant for the activatin of the sludge for further use or for its more or less complete oxidation.

I claim:

1. A solids-liquid contact clarifier for removing pollutants from waste water comprising, in combination:
    a. an enclosed clarification vessel capable of operating under a super-atmospheric pressure;
    b. waste water inlet means connected to said vessel;
    c. pump means connected to said waste water inlet means;
    d. inlet means for oxygen containing gas, connecting with said waste water inlet means prior to said pump connection, for increasing the concentration of oxygen in said waste water;
    e. means in the upper part of said vessel for withdrawing water containing a lesser amount of said pollutants than is contained in said original waste water;
    f. means connected to said withdrawing means for depressurizing said withdrawn water to decrease the amount of gas dissolved in said water, and to release gas;
    g. means connected to said depressurizing means for venting said released gas; and
    h. means for returning at least a part of said withdrawn water containing a lesser amount of said pollutants, to said vessel, including inlet means for oxygen containing gas and means for pressurizing back to super-atmospheric pressure both said withdrawn water and said gas, whereby said withdrawn water containing a lesser amount of said pollutants and an additional supply of oxygen is recycled through said clarifier.

2. The clarifier of claim 1, wherein said inlet means for oxygen containing gas is connected with said waste water inlet at the suction of said pump means, whereby mixing of said gas with said waste water in said pump means dissolves more oxygen at said super-atmospheric pressure of said vessel than could be dissolved in said waste water at atmospheric pressure.

3. The system of claim 1 in combination with means provided for recovering some part of the mechanical energy released in said withdrawal of said water containing a lesser amount of pollutants, said energy recovery means connected to said means for depressurizing said withdrawn water.

4. A solids-liquid contact clarifier, for removing pollutants from waste water, in combination with a ship and comprising, in combination:
    a. an enclosed clarification vessel capable of operating under a super-atmospheric pressure;
    b. waste water inlet means connected to said vessel;
    c. pump means connected to said waste water inlet means;
    d. inlet means for oxygen containing gas, connecting with said waste water inlet means prior to said pump connection, for increasing the concentration of oxygen in said waste water;
    e. means in the upper part of said vessel for withdrawing water containing a lesser amount of said pollutants than is contained in said original waste water;
    f. means connected to said withdrawing means for drpressurizing said withdrawn water to decrease the amount of gas dissolved in said water, and to release gas;
    g. means connected to said depressurizing means for venting said released gas;
    h. means for returning at least a part of said withdrawn water containing a lesser amount of said pollutants to said vessel, including inlet means for oxygen containing gas and means for pressurizing back to super-atmospheric pressure both said withdrawn water and said gas, whereby said withdrawn water containing a lesser amount of said pollutants and an additional supply of oxygen is recycled through said clarifier; and
    i. means for support of said clarifier in said ship.

5. The clarifier of claim 4 in combination with means provided in the lower part of said vessel for withdrawing some part of said pollutants as sludge solids, and means connected from said sludge withdrawal means to said pump means, whereby at least part of said sludge is recycled through said clarifier.

6. The clarifier in combination with a ship, of claim 4, wherein the vertical axis of said clarifier is located near a line drawn between the center of buoyancy and the meta-center of said ship.

7. The clarifier in combination with a ship, of claim 4, wherein the vertical axis of said clarifier is located near the central vertical plane of said ship extending from stem to stern.

8. The clarifier in combination with a ship, of claim 4, wherein said clarifier is supported from the structural frame of said ship by a pendulous suspension means, to compensate automatically for the motions due to roll and pitch of said ship.

9. The clarifier in combination with a ship, of claim 4, wherein said clarifier is supported from the structural frame of said ship by a gimbaled suspension means to compensate automatically for the motions due to roll and pitch of said ship.

* * * * *